United States Patent
Zambrini et al.

(10) Patent No.: US 11,246,319 B2
(45) Date of Patent: Feb. 15, 2022

(54) PROCESS FOR PREPARING A LACTOSE-FREE MILK

(71) Applicant: GRANAROLO S.P.A., Bologna (IT)

(72) Inventors: Angelo Vittorio Zambrini, Bologna (IT); Emanuela Donati, Bologna (IT); Claudio Russo, Bologna (IT); Daniele Pizzichini, Bologna (IT)

(73) Assignee: GRANAROLO S.P.A., Bologna (IT)

( * ) Notice: Subject to any disclaimer, the term of this patent is extended or adjusted under 35 U.S.C. 154(b) by 147 days.

(21) Appl. No.: 16/474,278

(22) PCT Filed: Dec. 21, 2017

(86) PCT No.: PCT/IB2017/058260
§ 371 (c)(1),
(2) Date: Jun. 27, 2019

(87) PCT Pub. No.: WO2018/122695
PCT Pub. Date: Jul. 5, 2018

(65) Prior Publication Data
US 2019/0335779 A1    Nov. 7, 2019

(30) Foreign Application Priority Data
Dec. 29, 2016    (IT) .................. 102016000132159

(51) Int. Cl.
*A23C 9/142* (2006.01)
*A23C 9/12* (2006.01)
*A23C 9/15* (2006.01)

(52) U.S. Cl.
CPC .......... *A23C 9/1422* (2013.01); *A23C 9/1206* (2013.01); *A23C 9/1427* (2013.01);
(Continued)

(58) Field of Classification Search
CPC ... A23C 9/1422; A23C 9/1206; A23C 9/1427; A23C 9/1512; A23C 2210/206; A23C 2210/252
(Continued)

(56) References Cited

U.S. PATENT DOCUMENTS

2009/0092731 A1    4/2009    Holst et al.
2015/0230484 A1    8/2015    Doring
(Continued)

FOREIGN PATENT DOCUMENTS

EP    3123869 A1    2/2017
SU    249925 A1    9/2015
(Continued)

OTHER PUBLICATIONS

Choi S. H. et al., "Development of lactose-hydrolyzed milk with low sweetness using nanofiltration", Asian Australasian Journal of Animal Scien. Suweon, KR, vol. 20, No. 6, Jan. 1, 2007, pp. 989-993.

(Continued)

*Primary Examiner* — Brent T O'Hern
(74) *Attorney, Agent, or Firm* — Silvia Salvadori, P.C.; Silvia Salvadori (57) ABSTRACT

A process for preparing lactose-free skimmed, partially skimmed and whole milk is proposed in which: (1) the milk is pasteurized and skimmed; (2) the skimmed milk is hydrolyzed enzymatically by a lactase; (3) the hydrolyzed skimmed milk is microfiltrated to obtain an ultrafiltration retentate (RMF) and a microfiltration permeate (PMF); (4) the PMF is ultrafiltrated and an ultrafiltration retentate (RUF) and an ultrafiltration permeate (PUF) are obtained, 5) the PUF is nanofiltrated and a first nanofiltration retentate (RNF1) and a first nanofiltration permeate (PNF1) are obtained, 6) the PNF1 is nanofiltrated to obtain a second nanofiltration retentate (RNF2) and a second nanofiltration permeate (PNF2), and 7) final step: lactose-free milk is obtained by mixing one or more of the fractions deriving from one or more of the previous steps.

10 Claims, 3 Drawing Sheets

(52) U.S. Cl.
CPC ...... *A23C 9/1512* (2013.01); *A23C 2210/206* (2013.01); *A23C 2210/252* (2013.01)

(58) Field of Classification Search
USPC .......................................................... 426/42
See application file for complete search history.

(56) References Cited

U.S. PATENT DOCUMENTS

| | | |
|---|---|---|
| 2016/0174586 A1 | 6/2016 | Puigferrat et al. |
| 2017/0020152 A1 | 1/2017 | Doring et al. |

FOREIGN PATENT DOCUMENTS

| | | | |
|---|---|---|---|
| WO | 2000045643 A1 | 8/2000 | |
| WO | 2003094623 A1 | 11/2003 | |
| WO | 2009043877 A1 | 4/2009 | |
| WO | 2010023361 A2 | 3/2010 | |
| WO | 2010023362 A2 | 3/2010 | |
| WO | WO-2010023362 A2 * | 3/2010 | ........... A23C 9/1422 |

OTHER PUBLICATIONS

Search Report and Written Opinion of PCT/IB2017/058260 dated Feb. 28, 2018.
Trouve' E. et al., "Retention de differentes especes microbiennes lors de l'epuration du lait par microfiltration en flux tangentiel", Dairy Science and Technology (Le Lait) EDP Sciences, Paris, FR., vol. 71, No. 1, Jan. 1, 1991, pp. 1-13.

* cited by examiner

PROCESS FOR PREPARING A LACTOSE-FREE MILK

This application is a U.S. national stage of PCT/IB2017/058260 filed on 21 Dec. 2017, which claims priority to and the benefit of Italian Application No. 102016000132159 filed on 29 Dec. 2016, the contents of which are incorporated herein by reference in their entireties.

FIELD OF INVENTION

The present invention refers to a process for preparing lactose-free milk, in particular a normal or high-protein milk with a residual lactose content of less than 0.01%, with a sensory profile comparable to the starting milk, in particular in terms of sweetness, and without adding ingredients and water extraneous to milk.

STATE OF THE ART

It is known that lactose intolerance is a widespread and growing phenomenon that results in a decrease in consumption of milk and fresh dairy products. The result is an increasing demand for milk and fresh dairy products with a lactose-reduced or even a lactose-free content. Currently, most lactose-free or lactose-reduced milks and their derivatives are obtained by enzymatic hydrolysis using lactase, which separates the disaccharide lactose, which is the sugar naturally present in milk in amounts of 4.6-4.9% w/v, in two monosaccharides: glucose and galactose. In the production process, lactase may be used before the milk heat treatment process and/or before its transformation, or in the case of ESL or UHT milk after the heat treatment by aseptic addition of a microfiltered enzyme. The presence in the milk matrix of the two monosaccharides, however, makes the lactose-free milk sweeter than the starting milk, since the two monosaccharides have a sweetening power greater than the one of lactose. The markedly sweet taste of this milk is not always accepted by the consumer and consequently a portion of the population interested in this product avoids buying it. This trend inevitably leads to the elimination of milk and fresh dairy products from the diet, thus resulting in a reduced daily intake of macro and micronutrients precious for a healthy eating.

To solve this problem, it is therefore essential that milk and its derivatives with reduced-lactose and/or lactose-free contents maintain their original sensory profile in order to meet the expectations of all consumers. To this end, various removal techniques of lactose from milk employing a membrane technology, often used in cascade, are known. Presently known processes start from whole or partially skimmed or skimmed milk and provide an initial heat treatment before the membrane separation. This allows obtaining one or more fractions of the starting milk, which can be simply diluted with water or recomposed in order to obtain a final product, which is then subjected to enzymatic hydrolysis. Membrane separation techniques have been known and applied for some time in the food and dairy fields. The use of membrane techniques is also useful and effective for separating small molecules (sugars, mineral salts, vitamins, amino acids and oligopeptides) from larger molecules, in particular proteins. These techniques do not require a phase of change in the physical state of the starting matrix and consequently result in low energy consumption. The used membranes are semi-permeable, have a mineral or polymeric nature and differ for the size of the pores, which largely determines the separation of the components based on the molecular weight cut-off. Reverse osmosis (OI) is usually used to concentrate solutes, ultrafiltration (UF) and microfiltration (MF) are used to fraction suspended substances, whereas nanofiltration (NF) is used to concentrate and fraction solutes.

In the dairy industry, the use of membranes is widespread as the milk matrix, containing many macro and micro components, is well suited to undergo membrane separation.

WO00/45643 describes a process for obtaining a milk with reduced lactose content (<0.2%) whose sweetness is equal to the starting milk. The milk, standardized in its components, undergoes UF and diafiltration (DF) by using extraneous water to obtain a 1:1 lactose:proteins ratio. The process provides a possible increase of the protein content (3.8-4.0% or even higher) by adding powdered proteins to the starting matrix and/or a concentration thereof. Subsequently, the remaining lactose is enzymatically hydrolysed (lactase) and the product thus obtained is thermally treated and packaged. A critical point of this process is represented by the loss of components other than lactose (mineral salts, vitamins, etc.) having an important nutritional and sensory impact on the finished product, as well as by the use of significant amounts of extraneous water.

WO 03/094623 describes the production of a completely lactose-free milk by means of an ultrafiltration process, thus obtaining a first retentate and a permeate, followed by nanofiltration of the obtained permeate, thus obtaining a NF retentate (mainly consisting of lactose) and a NF permeate (mainly consisting of mineral salts). The NF permeate is in turn subjected to reverse osmosis, thus producing another retentate and another permeate. Then the UF retentate is added to the OI retentate to form the milky base, which is enzymatically hydrolysed and extraneous water is added. The final product is a lactose-free milk. The process also provides a possible addition of whey-derived powdered mineral salts, consequently extraneous to the starting milk. The limit of this process is the loss of a significant amount of original milk components in the NF retentate, beside the use of extraneous water and mineral salts. US 2009/0092731 A1 describes a process for preparing a lactose-free milk (<0.50-0.01%), preferably with no water addition, comprising the following steps:

a) UF of the starting milk, thus obtaining a first UF retentate and permeate b) NF of the UF permeate, thus obtaining a first NF retentate and permeate c) mixing of the first UF retentate with the second NF permeate d) hydrolysis of the remaining lactose present in the mixture from step c) in order to obtain a finished lactose-free product having a taste and a content of calcium and proteins comparable to the starting milk.

The aforesaid process involves only one UF and only one NF, the enzymatic hydrolysis of remaining lactose only at the end of the process, just before the heat treatment and packaging of the milk, and does not exclude a priori a water addition to obtain the finished product.

In most of the published patents related to the production of lactose-reduced milk and derivatives, the enzymatic delactosation is carried out on the finished product before the final heat treatment and packaging. However, in some known delactosation processes the lactose enzymatic hydrolysis is carried out upstream of the membrane separation steps.

For example, WO2010/023362 describes a process for preparing milk with a reduced lactose content (<0.5%) comprising the following steps:

a) lactose hydrolysis in the starting raw material (milk, whey or mixtures thereof, as such or concentrated) and UF treatment, thus obtaining a retentate and a permeate;

b) the UF permeate undergoes NF, thus obtaining once again a retentate and a permeate;

c) optionally, at least one of the fractions coming from step a) and/or b) undergoes a further membrane separation (NF, DF and/or OI), evaporation and/or chromatographic separation for better separating proteins, sugars, mineral salts;

d) the final product, having the desired composition and degree of sweetness, is recomposed from one or more fractions obtained in step (a) and/or from one or more fractions obtained in step (b) and possible additions of one or more fractions obtained in step (c), basically with no water addition (admitted, however, in the DF up to 50% of the total diavolumes);

e) optionally, the product obtained in step d) is concentrated in a concentrate or in a powder.

In step a), an ultrafiltration membrane is preferably used as filtration membrane, whereas step b) can provide several membrane filtration steps, including nanofiltration.

In any case, the nanofiltrations provided in the present invention are carried out with membranes having a standard molecular weight cut-off (about 200 Das).

The retentate of the first nanofiltration according to this process is removed.

The final product is a lactose-reduced milk-based drink allowing a possible suitable cocoa addition.

WO2009043877 discloses a process including the following steps:

a) enzymatic hydrolysis of lactose contained in raw or previously heat treated milk, possibly standardized to a fat content between the natural content and 0, which reduces the lactose content to values between 0.1% and at most 3% by weight;

b) at least one ultrafiltration step of the milk from the previous step to obtain a permeate containing the hydrolysed sugar and an ultrafiltration retentate;

c) downstream of the ultrafiltration plant, at least one nanofiltration step to obtain at the end of the nanofiltration a retentate rich in glucose and galactose and a corresponding permeate;

d) mixing of the nanofiltration permeate with the ultrafiltration retentate;

e) water addition to the mixture from step d) to obtain a final content of sugars according to the desired finished product.

Even if the process can contemplate more nanofiltrations, actually only one is carried out with membranes having a standard molecular weight cut-off of 200 Das. The undoubted disadvantage of this process is that a considerable amount of drinking water must be added to obtain the right concentration in proteins and mineral salts having the same order of magnitude as those of the starting milk.

The object of the present invention is to provide an innovative multistep milk fractionation process for allowing the formulation, starting from said fractions of a known composition, of a normal or high-protein completely lactose-free milk (lactose residue <0.01%), whose organoleptic characteristics, and in particular degree of sweetness, are similar to those of a corresponding lactose-containing milk. Finally, a further object of the present invention is a delactosation process in which the enzymatic hydrolysis is carried out upstream of the fractionation, which does not involve the disadvantages of the aforesaid known processes and which, in particular, does not provide the addition of ingredients extraneous to the starting milk, and even more particularly, of water.

SUMMARY OF THE INVENTION

The applicant has now invented a process for the achievement of the aforementioned purposes.

This Process Includes:

1) pasteurization and skimming of the starting milk to obtain skimmed milk and cream,
2) enzymatic hydrolysis of the skimmed milk,
3) microfiltration of the hydrolysed skimmed milk and obtainment of a microfiltration retentate (RMF) and of a microfiltration permeate (PMF),
4) PMF ultrafiltration and obtainment of an ultrafiltration retentate (RUF) and of an ultrafiltration permeate (PUF),
5) first PUF nanofiltration and obtainment of the first nanofiltration retentate (RNF1) and of a first nanofiltration permeate (PNF1),
6) second PNF1 nanofiltration and obtainment of a second nanofiltration retentate (RNF2) and of a second nanofiltration permeate (PNF2), and
7) final step: obtainment of lactose-free milk by mixing one or more of the fractions deriving from one or more of the previous steps, which is characterized in that:

(I) the first nanofiltration of step 5) is carried out with membranes having a molecular weight cut-off ranging from 400 to 600 Das and the second nanofiltration is carried out with membranes having a molecular weight cut-off ranging from 150 to 250 Das, and (II) the final step 7) is carried out by mixing a composition comprising at least: the ultrafiltration retentate (RUF), the first nanofiltration retentate (RNF1) and the second nanofiltration permeate (PNF2).

The applicant has found that the use of a membrane in the so called "wide" nanofiltration step (NF1), characterized by a low rate of rejection to the monosaccharides, is very useful and innovative, since it allows removing from the permeate an important amount of sugars, while retaining the polyvalent salts and most of the riboflavin.

The following step (NF2) represents a so called classic "narrow" nanofiltration, whose objective is the concentration of most of the sugars in the second nanofiltration retentate, which is then removed, while recovering the permeate which constitutes the aqueous phase containing only residual amounts of monovalent salts and of monosaccharides.

If desired, the lactose-free milk obtained in step 7) can be concentrated and/or dried or transformed into dairy products according to the techniques known to those skilled in the art.

BRIEF DESCRIPTION OF THE SEVERAL VIEWS OF THE DRAWING(S)

In particular, FIGS. 2 and 3 represent preferred embodiments of the final steps of the process of the present invention, in which in particular the second nanofiltration retentate is further treated in order to recover in a the highest amount the salts contained in the aforesaid fraction.

DETAILED DESCRIPTION OF THE INVENTION

For the purposes of the present invention, enzymatic hydrolysis of lactose means hydrolysis performed by the lactase enzyme (eg MAXILAT LGi—DSM, NOLA FIT—Chr. Hansen, LACTOZYM PURE—Novozymes) on previously pasteurized skimmed milk and cream.

For the purposes of the present invention, VCR (Volumetric Concentration Ratio) means the volumetric ratio between the amount of product fed to each filtration step and the amount of retentate obtained, while MCR means the same ratio by mass.

As reported above, the applicant has therefore found a possible formulation and production of milk with a lactose content lower than 0.01%, with a high nutritional value, with a sensory profile comparable to the one of the same non-lactose-free milk, not using components extraneous to the milk.

According to a preferred embodiment of the process of the invention, the process can comprise at least one of the following further steps:
  to. a diafiltration step
  b. a reverse osmosis step
  c. a chromatography step.

Figure 1:
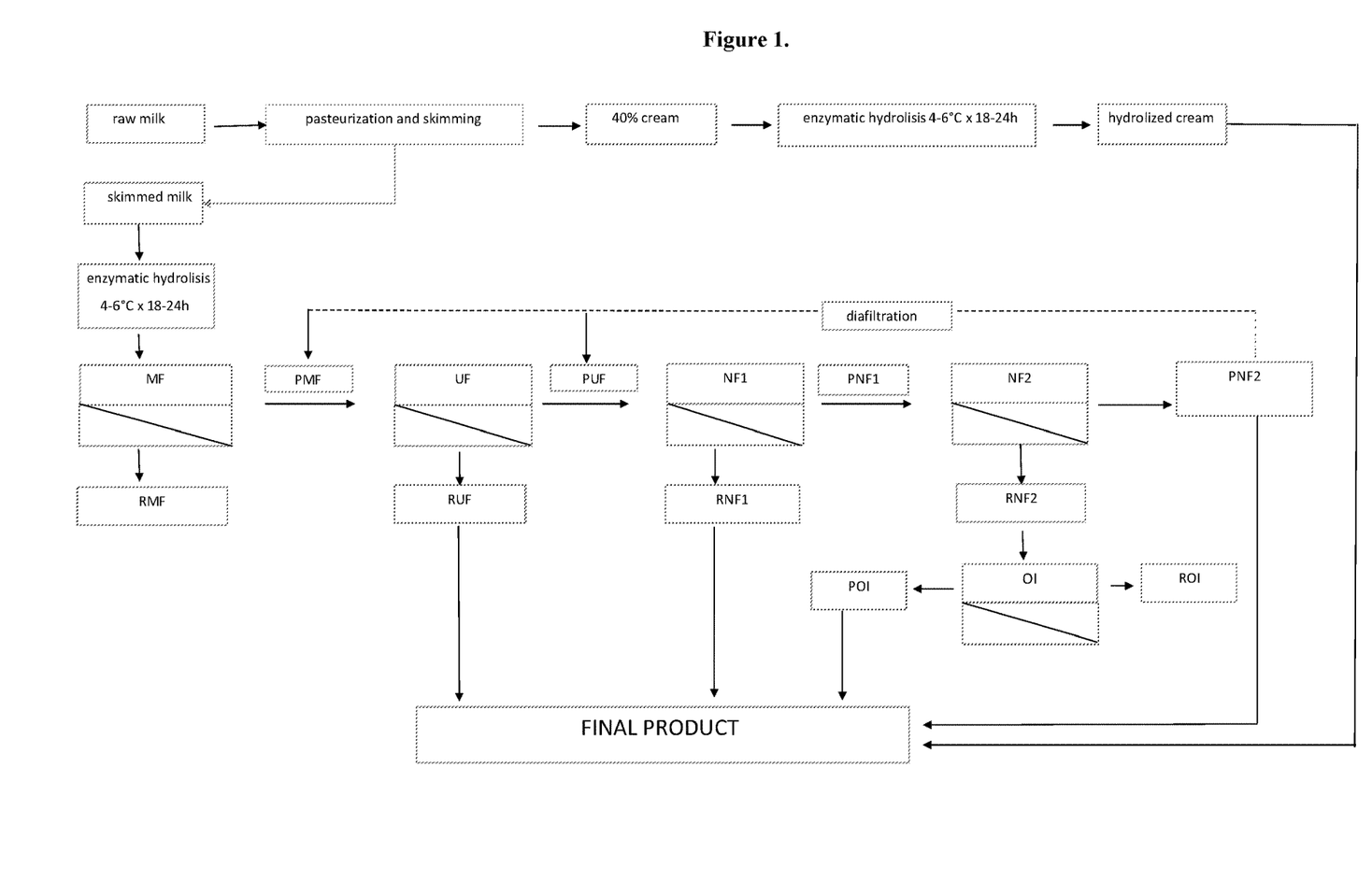
FIGS. 1-3 represents as a block diagram the preferred embodiment of the process of the invention.

When the process of the invention comprises the diafiltration step, the second nanofiltration permeate (PNF2) is used as a diafluid and fed to the first nanofiltration. In another preferred form, the same diafluid is fed to the ultrafiltration step (UF). In this case, the components of the mixture of step 7) remain the same as in the process of the invention (RUF, RNF1, PNF2), even though they are diafiltered. When the process of the invention comprises only reverse osmosis (OI) as a further step, the second nanofiltration retentate is concentrated in an OI retentate usable for other purposes and produces a permeate, essentially constituted by water, which can be a further component of the mixture referred to in step 7) of the inventive process. FIG. 1 shows two alternative embodiments of the invention comprising both the diafiltration step and the reverse osmosis step. The two embodiments differ by the fact that the PNF2 liquid is partly used as a diafluid and is fed to the ultrafiltration (dashed line) or to the first nanofiltration (continuous line).

When the process of the invention comprises a chromatography step, this is preferably associated with a reverse osmosis step, which can be upstream or downstream of the chromatography.

Figure 2:
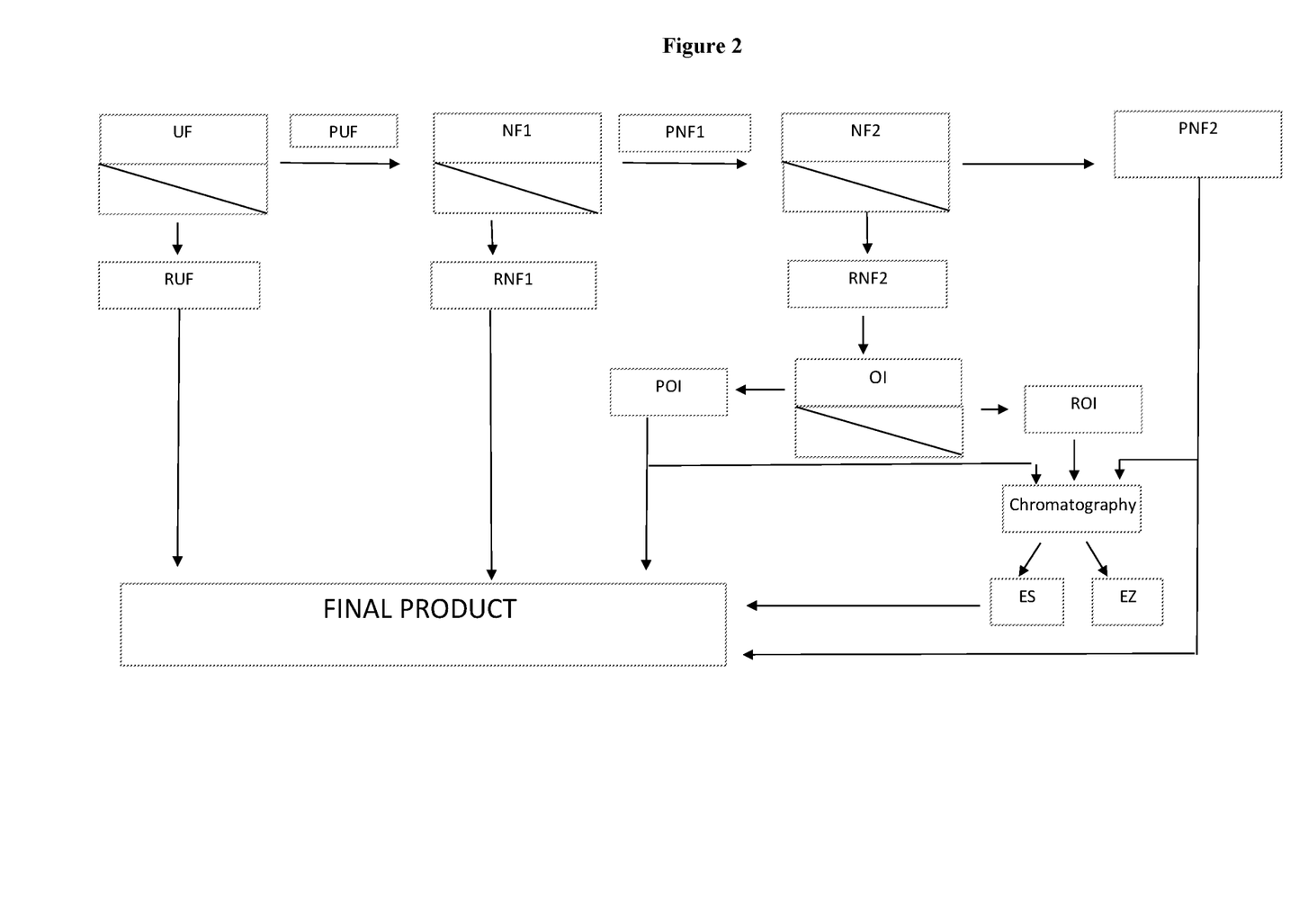

In the first case, shown in FIG. 2, the reverse osmosis retentate (ROI) is fed to the chromatographic column and eluted with the OI permeate and with a second nanofiltration permeate portion (PNF2). This allows obtaining two chromatographic fractions (ES and EZ), wherein the first contains the mineral salts and the second the sugars. In this case, the eluate saline (ES) will be one of the components of step 7) of the inventive process.

Figure 3:
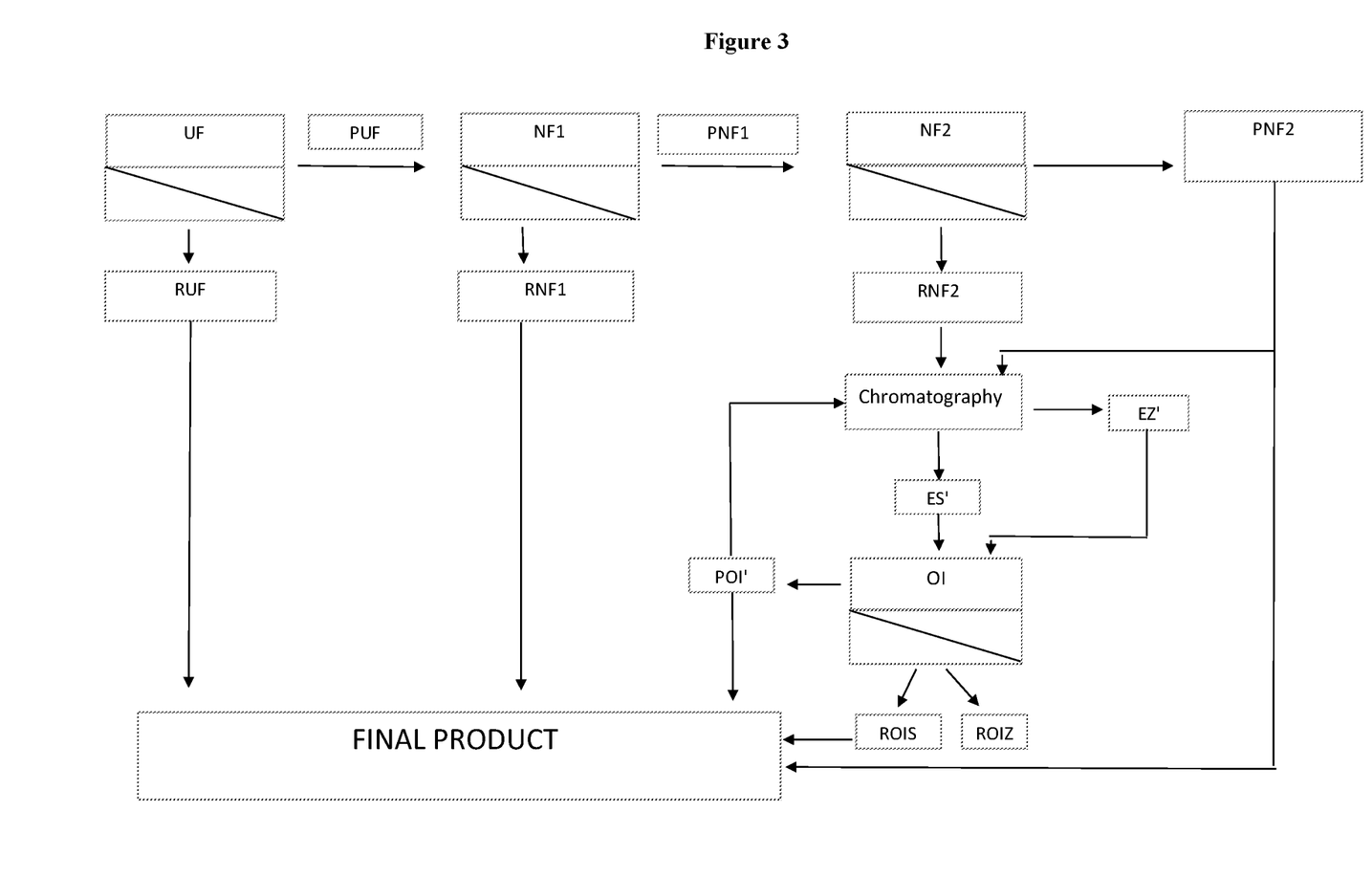

In the second case shown in FIG. 3, the second nanofiltration retentate (RNF2) is directly fed to the chromatographic column and eluted with a PNF2 portion to constitute two chromatographic fractions (ES' and EZ'). The ES' fraction undergoes the reverse osmosis step to give a salty retentate (ROIS) as well as a permeate (POI'). In this case, the final step 7) of the process of the invention will also include ROIS and POI'.

If desired, also the EZ' fraction can then be subjected to OI to give a sugary retentate (ROIZ) as well as a permeate (POI'). This latter can be used in the final step 7) of the process of the invention.

The process of the invention preferably comprises the following steps:
  1) pasteurization and simultaneous separation of raw milk into 40% fat cream and skimmed milk;
  2) enzymatic hydrolysis of pasteurized and skimmed milk, thus obtaining skimmed milk;
  2') optional enzymatic hydrolysis of the cream obtained in step 1) to give the hydrolysed cream;
  3) microfiltration of the skimmed milk from step 2), thus obtaining a retentate that can be removed (RMF) and a microfiltration permeate (PMF);
  4) ultrafiltration of the microfiltration permeate (PMF) to obtain an ultrafiltration permeate (PUF) and an ultrafiltration retentate (RUF);
  5) the ultrafiltration permeate (PUF) from step 4) undergoes a first nanofiltration in which the membranes have a molecular weight cut-off ranging from 400 to 600 Da, thus obtaining a first nanofiltration retentate (RNF1) and a first nanofiltration permeate (PNF1);
  6) the first nanofiltration permeate (PNF1) undergoes a second nanofiltration with a molecular weight cut-off between 150 and 200 Da, thus obtaining a second nanofiltration retentate (RNF2) that is removed and a second nanofiltration permeate (PNF2);
  7) obtainment of the final milk by mixing a composition comprising:
    the ultrafiltration retentate (RUF), the first nanofiltration retentate (RNF1) and the second nanofiltration permeate (PNF2), and possibly the hydrolysed cream from the previous optional step 2') in specific amounts to obtain the partially skimmed or whole milk (see example 2).

The final product, besides the above fractions, may also contain liquid fractions from the aforesaid steps a), b) and c).

The process object of the present invention is suitable for industrial productions particularly preferred on a large scale. If desired, the product obtained in step 7) can be concentrated and/or dried or transformed into dairy products according to the techniques known to those skilled in the art.

Some preferred operating conditions of the process of the invention are reported below.

Preferred Operating Conditions for Carrying Out the Process of the Invention

Step 1

In step 1) of the process object of the invention, the whole milk is subjected to pasteurization and skimming, thus producing the first two fractions: pasteurized skimmed milk and 40% fat cream, as it is known to those skilled in the art. Said fractions are cooled and stored at 4° C.±2° C.

Step 2

The lactase enzyme (eg MAXILAT LGi—DSM, NOLA FIT—Chr. Hansen, LACTOZYM PURE—Novozymes) is added to the pasteurized skimmed milk, preferably at a concentration between 2 and 6 g/l, and is left for 18-25 hours at a temperature between +2° C. and +6° C., in order to obtain a final lactose concentration of less than 0.01%. In a variant of the process object of the invention, the lactose hydrolysis can be carried out with the same procedures and the same result, even after the following step, in particular on the microfiltration permeate.

Step 3

The hydrolysed pasteurized skimmed milk is microfiltered on 1.4 μm ceramic membranes, at a temperature between 10° C. and 60° C., preferably between 40° C. and 60° C. The VCR preferably ranges between 100 and 200.

As widely known (F. Lipnizki "Cross Flow Membrane Applications in the Food Industry" Chapter 1 pp 1-7 "Membranes for food Applications"; 2010 Wiley-VCH Bosch Str.12.69469; I. Pafylias et al., "Microfiltration of milk with ceramic membranes", pp. 141-146, Food research International Vol. 29, No. 2, 1996.), the pore size of the of the microfiltration membranes in the food and especially in the dairy industry has the aforementioned value of 1.4 μm. In fact, only this size allows removing all corpuscles naturally present in milk, namely micro-organisms and somatic cells, without altering the composition of the milk that is fed to the microfiltration.

Step 4

The microfiltration permeate passes to the ultrafiltration step, preferably on wound spiral polymer membranes, with a MWCO between 5,000 and 30,000 Da (e.g. Microdyn-Nadir Spira-cel IS UH030 4040 C1, Osmonics Desal PW 4040 C30, Trisep 4040 UF10 QSF), preferably at a temperature between 10° C. and 60° C., more preferably between 40° C. and 60° C. The VCR preferably ranges from 2 to 5, more preferably from 3.5 to 4.5. The inlet pressure, preferably constant, is more preferably between 4.1 and 4.4 bar.

The so obtained UF retentate, containing all milk proteins, is cooled and stored at 4° C.±2° C.

Step 5

The UF permeate is fed, preferably at a temperature between 10° C. and 50° C., more preferably between 8° C. and 20° C., to the first nanofiltration step (NF1), preferably operating with a wound spiral polymer membrane 400-600 Da MWCO (e.g. Trisep TurboClean 4040-N2F3T9, membrane XN45) with a VCR preferably of 5-10. As previously stated, the applicant has found that the use of a "wide" nanofiltration membrane, characterized by a low rate of rejection to the monosaccharides, is very useful and innovative as it allows removing an important amount of sugars from the permeate, while retaining the polyvalent salts and most of the riboflavin.

The NF1 retentate is cooled and stored at 4° C.±2° C.

Step 6

The NF1 permeate is fed directly to the second nanofiltration step (NF2), operating with a wound spiral polymer membrane, preferably a 150-250 Da MWCO (e.g. Desal DK 4040 F1020, or Trisep 4040 TS or Osmonics-Desal Vinopro NF4040C35), preferably with a VCR of 5-10. This step represents a classic "narrow" nanofiltration, whose objective is the concentration of sugars while allowing to recover the permeate, i.e. the aqueous phase containing only residual amounts of monovalent salts and monosaccharides. The NF2 retentate, constituting 5 to 10% of the volume of the starting skimmed milk, can be used in the formulation of other sweetened dairy products instead of part of the sucrose. Both nanofiltration steps preferably operate at a controlled and constant temperature, preferably between 10° C. and 50° C., more preferably between 8° C. and 20° C. Inlet pressures are increasing, preferably from 8 to 60 bar. Both the retentate and the NF2 permeate are cooled and stored at 4° C.±2° C.

Optional Steps

Step a): Diafiltration

As previously stated, the applicant has also found that it is possible to apply a diafiltration process, either on the ultrafiltration retentate (RUF) or on the one of the first nanofiltration (RNF1), using for this purpose not water but the second nanofiltration permeate (PNF2) and possibly also the reverse osmosis permeate (POI) until reaching the same VCR for each step. In this way, an increase in the sugar concentration in RNF2 is obtained.

Step b): Reverse Osmosis

The NF2 retentate can be subjected to subsequent reverse osmosis (OI) operating at temperatures between 6° C. and 50° C., with a 10-100 Da MWCO membrane, (e.g. Osmonics-Desal Vinocon R01 4040C30, Dow-FILMTEC FT30), with a VCR≥2. This allows obtaining a reverse osmosis retentate (ROI), which is a concentrate of salts and sugars, and a reverse osmosis permeate (POI), which is normally used as the PNF2 for the final milk formulation.

Step c): Chromatography Downstream Reverse Osmosis

In order to improve the recovery of the original salts of the starting milk, the applicant has also found that it is possible to use chromatographic techniques. A chromatography column loaded with a cationic resin (e.g. DIAION UNK 532, Mitsubishi Chemical) duly preconditioned with MHSM, thermostated at a temperature between 4° C. and 65° C., preferably lower than or equal to 10° C. or higher than or equal to 60° C. to minimize any bacterial growth, can be fed with the reverse osmosis retentate (ROI) and eluted with the reverse osmosis permeate (POI) and, pro quota, with the second nanofiltration permeate (PNF2) to give two fractions, the first one essentially containing mineral salts (ES) and the second one containing glucose and galactose (EZ). The first eluate (ES) can be used in the formulation of the final milk.

Step c): Chromatography Upstream Reverse Osmosis

Alternatively, the chromatographic column, balanced and thermostated as above, can be fed directly with the second nanofiltration retentate (RNF2) using as an eluent a portion of the second nanofiltration permeate (PNF2) and thus obtaining a first eluate containing salts (ES') and a second eluate containing sugars (EZ').

The above obtained fractions are separately concentrated by reverse osmosis and the permeate of the two distinct osmoses can be partly recycled for the elution of the chromatographic column or fed to step 7). The salt elution is continuously monitored by means of an electrical conductivity measurement, while the sugar elution by means of refractometry.

The salty retentate (ROIS) is fed to step 7).

Step 7)

The formulation of the final milk in step 7) is carried out by mixing RUF, RNF1 and PNF2 and optionally fractions preferably selected among POI, POI', ES, ES', ROIS to obtain the desired composition. The final milk thus obtained is then subjected to heat treatment (pasteurization, high pasteurization, UHT treatment) and packaged as desired. If desired, the product can be subjected to concentration and/or drying or used for processing into dairy products according to techniques known to those skilled in the art.

Some examples of the process for preparing the lactose-free milk according to the present invention are given for illustrative, but not limitative purposes.

Example No. 1: Preparation of High-Pasteurized Lactose-Free ESL Partially Skimmed Milk Raw milk has been subjected to pasteurization and centrifugal separation, thus obtaining skimmed milk and 40% fat cream.

The cream was pasteurized and cooled to 4-6° C.; after addition of lactase (MAXILAT LGi-DSM, 0.7%) the lactose was fully hydrolysed to glucose and galactose in 18 hours at the temperature of 4-6° C. In this way, a 40% fat pasteurized hydrolysed cream was obtained, to be used later for the formulation of the finished product.

The skimmed milk, cooled at the temperature of 4-6° C., was added with lactase in a concentration of 4.5 g/l, thus obtaining the complete hydrolysis of lactose (residual lactose <0.01%) after 18 hours.

The lactose-free skimmed milk (HSM) was then heated to a temperature of 45° C. and microfiltered on a 1.4 μm ceramic membrane plant (VCR=200).

The thus obtained microfiltration permeate (i.e. the microfiltered, lactose-free, skimmed milk MHSM) is sent directly to the next ultrafiltration step on a wound spiral polymer membrane system, with a 30,000 Da MWCO (Microdyn-Nadir Spira-cel IS UH030 4040 C1).

The ultrafiltration retentate (RUF), containing all protein components of MHSM, has been cooled to 4-6° C. and stored at that temperature until its use for the formulation of the finished product.

The ultrafiltration permeate (PUF) was instead cooled to 10° C. and fed to the subsequent nanofiltration step (NF1) carried out by means of a wound spiral polymer membrane system, 400-600 Da MWCO (Trisep TurboClean 4040-N2F3T9, membrane XN45) with a VCR of 10. The first nanofiltration retentate (RNF1), rich in riboflavin and polyvalent salts, was cooled to 4-6° C. and stored at that temperature until its use for the formulation of the finished product.

The first nanofiltration permeate (PNF1) was then subjected to a second nanofiltration operating with a wound spiral polymer membrane, preferably a 200 Da MWCO (Desal DK 4040 F1020) until reaching a VCR of 10, always at a temperature of 10° C.

A second nanofiltration retentate (RNF2) was obtained, rich in simple sugars and in monovalent salts, which was cooled to 4-6° C. and sent to other uses, while the corresponding permeate, after cooling, was stored at 4-6° C. until its use for the formulation of the finished product.

The formulation of the finished product was carried out by mixing the hydrolysed cream, RUF, RNF1 and PNF2 according to the proportions indicated in Table 1, which also shows the composition of the individual fractions beside the one of the finished product. All percentages are expressed M/M.

The formulation was subjected to ultra-pasteurization in the plant (APV-AN SPX Brand) and to aseptic packaging to give a lactose-free high pasteurized ESL partially skimmed milk to be stored and distributed in the cold chain.

TABLE 1

Composition of a lactose-free partially skimmed milk, from hydrolysed cream, UF and NF retentates and second nanofiltration permeate

|  | Lactose-free cream 40+ | RUF | RNF1 | PNF2 | Lactose-free milk PS |
|---|---|---|---|---|---|
| Proportion (%) | 4.0 | 25.4 | 5.9 | 64.7 | 100.0 |
| Proteins (N × 6.38; %) | 2.04 | 13.20 | 0.42 | 0.10 | 3.53 |
| Glucose (%) | 1.50 | 2.17 | 6.30 | 0.90 | 1.57 |
| Galactose (%) | 1.50 | 2.17 | 6.30 | 0.90 | 1.57 |
| Ashes (%) | 0.44 | 1.71 | 1.47 | 0.19 | 0.66 |
| Dry residue (%) | 40.55 | 19.26 | 14.49 | 2.09 | 8.72 |

Example No. 2: Preparation of Lactose-Free UHT Whole Milk

Raw milk was subjected to pasteurization and centrifugal separation, thus obtaining skimmed milk and 40% fat cream.

The cream was pasteurized and cooled to 4° C.; after addition of lactase (MAXILAT LGi-DSM, 0.7%) the lactose was fully hydrolysed to glucose and galactose in 24 hours at a temperature of 4° C. This allowed obtaining a 40% fat, pasteurized, hydrolysed cream to be used later for the formulation of the finished product.

The skimmed milk was heated to 50° C. and microfiltered on a 1.4 µm ceramic membrane plant (VCR=200).

The microfiltration permeate was cooled to 4° C. and subjected to the same hydrolysis temperature by addition of lactase (MAXILAT LGi-DSM) at a concentration of 2.1 g/l for 24 hours, until obtaining a lactose residual content lower than 0.01%. The thus obtained microfiltered lactose-free hydrolysed skimmed milk (MHSM) passed, after heating to 50° C., to the subsequent ultrafiltration step on a wound spiral polymer membrane system (Microdyn-Nadir Spira-cel IS UH030 4040 C1) (MWCO=30 kDa; VCR=4.5).

RUF, which contains all protein components of MHSM, was cooled to 4° C. and stored at this temperature until its use for the formulation of the finished product.

PUF was instead cooled to 10° C. and fed to the subsequent nanofiltration step carried out by means of a wound spiral polymer membrane system 400-600 Da MWCO (Trisep TurboClean 4040-N2F3T9, membrane XN45) operating at constant temperature, until reaching a VCR of 10.2.

RNF1, rich in riboflavin and polyvalent salts, was cooled to 4° C. and stored at this temperature until its use for the formulation of the finished product.

PNF1 was subsequently subjected to a second nanofiltration on a wound spiral polymer membrane system (GE-WATER-DK-4040 C30) until reaching a VCR of 10, always at a temperature of 10° C.

PNF2, after cooling, has been stored at 4° C. until its use for the formulation of the finished product.

RNF2, rich in simple sugars and in monovalent salts, was cooled to 10° C. and fed to a subsequent reverse osmosis (OI) step on a SW-type TPE plant, equipped with two 4" membranes type RO 3840, and processed until a VCR=2. The reverse osmosis retentate was then cooled to 4° C. and sent to other uses, while the corresponding permeate (POI), after cooling, was stored at 4° C. until its use for the formulation of the finished product.

The formulation of the finished product was carried out by mixing the hydrolysed cream, RUF, RNF1, PNF2 and POI according to the proportions indicated in Table 2, which also shows the composition of the individual fractions beside the one of the finished product. All percentages are expressed M/M.

The formulation was subjected to UHT treatment in the plant (APV-AN SPX Brand) and to aseptic packaging to give a lactose-free sterilised UHT whole milk to be stored and distributed at room temperature.

TABLE 2

Composition of a lactose-free whole milk starting from hydrolysed cream, UF and NF retentates, second nanofiltration and reverse osmosis permeate

|  | Lactose-free cream 40+ | RUF | RNF1 | PNF2 | POI | Lactose-free whole milk |
|---|---|---|---|---|---|---|
| Proportion (%) | 8.8 | 22.3 | 7.5 | 58.0 | 3.5 | 100.0 |
| Proteins (N × 6.38; %) | 2.04 | 14.55 | 0.56 | 0.08 | 0.0 | 3.51 |
| Glucose (%) | 1.50 | 2.15 | 6.92 | 0.75 | 0.0 | 1.56 |
| Galactose (%) | 1.50 | 2.15 | 6.92 | 0.75 | 0.0 | 1.57 |
| Ashes (%) | 0.44 | 1.67 | 1.79 | 0.19 | 0.0 | 0.66 |
| Dry residue (%) | 40.55 | 20.52 | 18.91 | 1.77 | 0.0 | 10.77 |

Example No. 3: Preparation of Lactose-Free High Protein High-Pasteurized ESL Skimmed Milk Raw milk was subjected to pasteurization and centrifugal separation, thus obtaining skimmed milk and 40% fat cream.

The skimmed milk, cooled at the temperature of 4° C., was added with lactase (MAXILAT LGi-DSM) at a concentration of 4.5 g/l, thus obtaining the complete hydrolysis of lactose (residual lactose <0.01%) in 12 hours.

The lactose-free skimmed milk was then heated to 50° C. and microfiltered on a 1.4 μm ceramic membrane plant (VCR=200). The thus obtained microfiltration permeate (microfiltered, lactose-free, skimmed milk MHSM) was sent directly to the next ultrafiltration step on a wound spiral polymer membrane plant (Microdyn-Nadir Spira-cel IS UH030 4040 C1, MWCO=30 kDa, VCR=4.5).

RUF, which contains all protein components of MHSM, was cooled to 4° C. and stored at this temperature until its use for the formulation of the finished product.

PUF was instead cooled to 10° C. and fed to the subsequent nanofiltration step (NF1) carried out by means of a wound spiral polymer membrane system 400-600 Das MWCO (Trisep TurboClean 4040-N2F3T9, membrane XN45) operating at a constant temperature, until reaching a VCR of 10.2. RNF1, rich in riboflavin and polyvalent salts, was cooled to 4° C. and stored at this temperature until its use for the formulation of the finished product.

PNF1 was subsequently subjected to a second nanofiltration on a wound spiral polymer membrane system 150-250 Das MWCO (Desal DK 4040 F1020) up to a 9.9 VCR, at a temperature of 20° C.

PNF2, after cooling, was stored at 4° C. until its use for the formulation of the finished product.

RNF2, rich in simple sugars and monovalent salts, was cooled to 10° C. and fed to a subsequent reverse osmosis (OI) step on a SW-type TPE plant, equipped with two 4" RO 3840 membranes, and processed until reaching a VCR=2. ROI was then cooled to 4° C. and sent to other uses, while the corresponding permeate, after cooling, was stored at 4° C. until its use for the formulation of the finished product.

The formulation of the finished product was carried out by mixing RUF, RNF1, PNF2 and POI according to the proportions indicated in Table 3, which also shows the composition of the individual fractions beside the one of the finished product. All percentages are expressed M/M.

The formulation was subjected to ultra-pasteurization in the plant (APV-AN SPX Brand) and to aseptic packaging to give a lactose-free high protein high-pasteurized ESL skimmed milk to be stored and distributed in the cold chain.

TABLE 3

Composition of a lactose-free high protein skimmed milk from hydrolysed cream, UF and NF retentates, second nanofiltration and reverse osmosis permeate

|  | Lactose-free cream 40+ | RUF | RNF1 | PNF2 | POI | High protein lactose-free skimmed milk |
|---|---|---|---|---|---|---|
| Proportion (%) | 0.0 | 30.5 | 7.0 | 59.0 | 3.5 | 100.0 |
| Proteins (N × 6.38; %) | 2.04 | 14.55 | 0.56 | 0.08 | 0.0 | 4.52 |
| Glucose (%) | 1.50 | 2.15 | 6.92 | 0.75 | 0.0 | 1.58 |
| Galactose (%) | 1.50 | 2.15 | 6.92 | 0.75 | 0.0 | 1.58 |
| Ashes (%) | 0.44 | 1.67 | 1.79 | 0.19 | 0.0 | 0.75 |
| Dry residue (%) | 40.55 | 20.52 | 18.91 | 1.77 | 0.0 | 8.63 |

Example No. 4: Preparation of Lactose-Free High-Pasteurized ESL Partially Skimmed Milk Raw milk was subjected to pasteurization and centrifugal separation, thus obtaining skimmed milk and 40% fat cream.

The cream was pasteurized and cooled to 4° C.; after addition of lactase (MAXILAT LGi-DSM, 0.7%), lactose was fully hydrolysed to glucose and galactose in 24 hours at a temperature of 4° C. This allowed obtaining a 40% fat pasteurized hydrolysed cream to be used later for the formulation of the finished product.

The skimmed milk was heated to 50° C. and microfiltered on a 1.4 μm ceramic membrane plant (VCR=200). The microfiltration permeate was cooled to 4° C. and subjected to hydrolysis by addition of lactase (MAXILAT LGi-DSM, 0.7%) at the same temperature for 24 hours, until obtaining a residual lactose content lower than 0.01%. The thus obtained microfiltered lactose-free skimmed milk (MHSM) passed, after heating to 50° C., to the subsequent ultrafiltration step on a wound spiral polymer membrane system, Microdyn-Nadir Spira-cel IS UH030 4040 C1, MWCO=30 kDa, VCR=4.5).

RUF, which contains all protein components of MHSM, was cooled to 4° C. and stored at this temperature until its use for the formulation of the finished product.

The UF permeate was instead cooled to 10° C. and fed to the subsequent nanofiltration step (NF1) carried out by means of a wound spiral polymer membrane system 400-600 Das MWCO (Trisep TurboClean 4040-N2F3T9, membrane XN45) operating at a constant temperature, until reaching a VCR of 10.

RNF1, rich in riboflavin and polyvalent salts, was cooled to 4° C. and stored at this temperature until its use for the formulation of the finished product.

PNF1 was subsequently subjected to a second nanofiltration on a wound spiral polymer membrane system 150-250 Das MWCO (GE-WATER-DK-4040 C30) until reaching a VCR of 10, at a temperature of 20° C.

To carry out the diafiltration, PNF2 was now used as a diafluid, mixing it in a double amount with respect to the volumetric amount of RNF1. The new fraction thus obtained has been subjected to two nanofiltrations in series following the aforesaid procedure, applying the VCRs, which allow reaching the same original volumes of RNF1 and RNF2, as well as of PNF2 permeate.

PNF2, which also includes the two diavolumes deriving from the diafiltration process, after cooling was stored at 4° C. until its use for the formulation of the finished product.

RNF2, rich in simple sugars and monovalent salts, was cooled to 10° C. and fed to a subsequent reverse osmosis (OI) step on a SW-type TPE plant, equipped with two 4" RO 3840 membranes, and processed until reaching a VCR=2. ROI was then cooled to 4° C. and sent to other uses, while the corresponding permeate, after cooling, was stored at 4° C. until its use for the formulation of the finished product.

The formulation of the finished product was carried out by mixing the hydrolysed cream, RUF, diafiltered RNF1, PNF2 and POI according to the proportions indicated in Table 4, which also shows the composition of the individual fractions used beside the one of the finished product. All percentages are expressed M/M.

The formulation was subjected to UHT treatment in the plant (APV-AN SPX Brand) and aseptic packaging to give a lactose-free sterilized UHT partially skimmed milk to be stored and distributed at room temperature.

TABLE 4

Composition of a lactose-free partially skimmed milk from hydrolysed cream, UF and NF retentates, second nanofiltration and reverse osmosis permeate

|  | Lactose-free cream 40+ | RUF | RNF1 | PNF2 | POI | Lactose-free PS milk |
|---|---|---|---|---|---|---|
| Proportion (%) | 4.0 | 23.0 | 9.5 | 61.4 | 2.2 | 100.0 |
| Proteins (N × 6.38; %) | 2.04 | 14.55 | 0.34 | 0.08 | 0.0 | 3.51 |
| Glucose (%) | 1.50 | 2.70 | 2.43 | 0.55 | 0.0 | 1.49 |
| Galactose (%) | 1.50 | 2.70 | 2.44 | 0.55 | 0.0 | 1.50 |
| Ashes (%) | 0.44 | 1.67 | 1.79 | 0.21 | 0.0 | 0.73 |
| Dry residue (%) | 40.55 | 21.74 | 7.00 | 1.39 | 0.0 | 8.63 |

Example No. 5: Preparation of Lactose-Free UHT Skimmed Milk

Raw milk was subjected to pasteurization and centrifugal separation, thus obtaining skimmed milk and 40% fat cream.

The skimmed milk, cooled to the temperature of 4° C., was added with lactase (MAXILAT LGi) in a concentration of 4.5 g/l to obtain the complete hydrolysis of lactose (residual lactose <0.01%) in 12 hours.

The lactose-free skimmed milk was then heated to 50° C. and microfiltered on a 1.4 µm ceramic membrane plant (VCR=200). The microfiltration permeate (microfiltered, lactose-free, skimmed milk MHSM) thus obtained, was sent directly to the next ultrafiltration step on a wound spiral polymer membrane system 30,000 Das MWCO (Microdyn-Nadir Spira-cel IS UH030 4040 C1) until reaching a VCR=4.5.

RUF, which contains all protein components of MHSM, was cooled to 4° C. and stored at this temperature until its use for the subsequent diafiltration step.

PUF was instead cooled to 10° C. and fed to the subsequent nanofiltration step (NF1) carried out by means of a wound spiral polymer membrane system 400-600 Das MWCO (Trisep TurboClean 4040-N2F3T9, membrane XN45) operating at constant temperature, until reaching a VCR of 10.

RNF1, rich in riboflavin and polyvalent salts, was cooled to 4° C. and stored at this temperature until its use for the formulation of the finished product.

PNF1 was subsequently subjected to a second nanofiltration on a wound spiral polymer membrane system 150-250 Das MWCO (Desal DK 4040 F1020) until reaching a VCR of 10, always at a temperature of 20° C.

PNF2, after cooling, was stored at 4° C. until its use for the formulation of the finished product.

RNF2, rich in simple sugars and in monovalent salts, was cooled to 10° C. and then processed by chromatography in order to separate the mineral salts from the sugars. The chromatographic separation was carried out on a column loaded with a cationic resin (DIAION UNK 532, Mitsubishi Chemical), previously balanced with skimmed milk and washed with deionized water, at a temperature of 10° C. NF2 permeate was used as eluent. The first fraction, which contained the milk mineral salts, was concentrated in a subsequent reverse osmosis (OI) step on a SW-type TPE plant, equipped with two 4" RO 3840 membranes, and processed until reaching a VCR=10. The retentate (ROIS) and the reverse osmosis permeate (POI'), after cooling, were stored at 4° C. until their use for the formulation of the finished product.

The formulation of the finished product was carried out by mixing RUF, NF1, PNF2, ROIS and POI' according to the proportions indicated in Table 5, which also shows the composition of the individual fractions beside the one of the finished product. All percentages are expressed M/M.

The formulation was subjected to UHT treatment in APV-AN SPX Brand and to aseptic packaging to give a lactose-free sterilized UHT skimmed milk to be stored and distributed at room temperature.

TABLE 5

Composition of a lactose-free skimmed milk from UF and NF retentates, second nanofiltration permeate, chromatography saline eluate concentrated by OI

|  | RUF | RNF1 | PNF2 | ROIS | POI' | Lactose-free skimmed milk |
|---|---|---|---|---|---|---|
| Proportion (%) | 23.4 | 7.6 | 18.0 | 5.5 | 45.1 | 100.0 |
| Proteins (N × 6.38; %) | 14.70 | 0.56 | 0.12 | 0.00 | 0.00 | 3.51 |
| Glucose (%) | 2.25 | 6.90 | 1.40 | 2.20 | 0.00 | 1.46 |
| Galactose (%) | 2.25 | 6.90 | 1.40 | 2.20 | 0.00 | 1.46 |
| Ashes (%) | 1.67 | 1.79 | 0.31 | 3.20 | 0.00 | 0.77 |
| Dry residue (%) | 20.72 | 16.15 | 2.07 | 7.60 | 0.00 | 6.99 |

The invention claimed is:

1. Process for preparing lactose-free milk comprising the following steps:
   1) pasteurization and skimming and obtainment of skimmed milk and cream,
   2) enzymatic hydrolysis of the skimmed milk by lactase enzyme, thereby obtaining a hydrolysed skimmed milk;
   3) microfiltration (MF) of the hydrolysed skimmed milk and obtainment of a microfiltration retentate (RMF) and of a microfiltration permeate (PMF),
   4) PMF ultrafiltration and obtainment of an ultrafiltration retentate (RUF) and of an ultrafiltration permeate (PUF),
   5) first PUF nanofiltration and obtainment of a first nanofiltration retentate (RNF1) and of a first nanofiltration permeate (PNF1),
   6) second PNF1 nanofiltration and obtainment of a second nanofiltration retentate (RNF2) and of a second nanofiltration permeate (PNF2), and
   7) obtainment of lactose-free milk by combining one or more fractions deriving from one or more of the previous steps, wherein
   (I) the first PUF nanofiltration of step 5) is carried out on membranes with a molecular size of 400-600 Da and the second PNF1 nanofiltration of step 6) is carried out on membranes with a molecular size of 150-250 Da, and
   (II) the step 7) is carried out by mixing a composition comprising:
   the ultrafiltration retentate (RUF), the first nanofiltration retentate (RNF1) and the second nanofiltration permeate (PNF2).

2. Process according to claim 1, comprising at least one of the following steps selected from:
   a. a diafiltration step
   b. a reverse osmosis step
   c. a chromatography step.

3. Process according to claim 2, comprising diafiltration step a., wherein the second nanofiltration permeate (PNF2) is used as diafluid and fed to the first nanofiltration or to an ultrafiltration (UF) and the fractions combined in step 7)

consist of the ultrafiltration retentate (RUF), the first nanofiltration retentate (RNF1) and the second nanofiltration permeate (PNF2).

4. Process according to claim 2, comprising reverse osmosis (OI) as single step, wherein the second nanofiltration retentate (RNF2) is concentrated in a reverse osmosis retentate (ROI) and reverse osmosis permeate (POI), essentially containing water, which is a further component of the fractions combined in step 7).

5. Process according to claim 2, comprising a chromatography step c., and a reverse osmosis step b., which is carried out upstream or downstream of said step c.

6. Process according to claim 5, wherein when step b. is carried out upstream of step c., the reverse osmosis retentate (ROI) is fed to a chromatographic column and eluted with a portion of a second nanofiltration permeate (PNF2), thus obtaining two chromatographic fractions; a saline eluate (ES) and a sugary eluate (EZ), wherein the saline eluate (ES) contains mineral salts and the sugary eluate (EZ) contains sugars, the saline eluate (ES) being one of the fractions combined in step 7).

7. Process according to claim 5, wherein, when step b. is carried out downstream of step c., the second nanofiltration retentate (RNF2) is directly fed to a chromatographic column and eluted with a portion of a second nanofiltration permeate (PNF2) to form two chromatographic fractions, a saline eluate (ES') and a sugary eluate (EZ)', wherein the saline eluate (ES') undergoes reverse osmosis to yield a saline retentate (ROIS) as well as a permeate (POI') and the fractions combined in step 7) comprise the saline retentate (ROIS) and the permeate of reverse osmosis (POI') as further fractions, the sugary eluate (EZ') is in turn concentrated by reverse osmosis to yield a retentate (ROIZ) and a permeate (POI') which constitutes a further fraction of the fractions to be combined in step 7).

8. Process according to claim 1, comprising a step 2') of enzymatic hydrolysis of the cream obtained in step 1), thus obtaining a hydrolysed cream, which constitutes a further fraction of the fractions to be combined in step 7).

9. Process according to claim 1, wherein the first and the second nanofiltrations of steps 5) and 6) are carried out with a Volumetric Concentration Ratio (VCR) between 6 and 10.

10. Process according to claim 1, wherein the lactose free milk obtained in step 7) is subjected to concentration and/or drying or is used as raw material for processing into dairy products.

* * * * *